United States Patent [19]
Compton et al.

[11] Patent Number: 4,624,290
[45] Date of Patent: Nov. 25, 1986

[54] PREFILLED HYDRAULIC CONTROL APPARATUS FOR MOTOR VEHICLE

[75] Inventors: David J. Compton, Troy; Richard A. Nix, Utica; Keith V. Leigh-Monstevens, Troy, all of Mich.

[73] Assignee: Automotive Products plc, Warwickshire, England

[21] Appl. No.: 555,667

[22] Filed: Nov. 28, 1983

[51] Int. Cl.$^4$ ............................................. B65B 3/04
[52] U.S. Cl. ..................................... 141/1; 141/83; 141/98; 141/392; 60/584; 60/592; 24/16 PB; 24/17 AP; 92/15; 92/23; 137/852; 137/854; 188/352; 303/64
[58] Field of Search ............ 24/16 PB, 17 AP; 403/2; 215/250; 220/89 A, 265; 137/852, 68 R, 68 A, 71, 70, 854; 92/15, 23; 60/635, 636, 584, 585, 592; 141/1-12, 98, 392, 83; 188/352; 303/56-63

[56] References Cited
U.S. PATENT DOCUMENTS
4,454,632 6/1984 Nix et al. ............................ 60/684

Primary Examiner—Houston S. Bell, Jr.
Attorney, Agent, or Firm—Hauke and Patalidis

[57] ABSTRACT

A hydraulic control apparatus, more particularly for operating a motor vehicle clutch release mechanism, comprising a master cylinder, a slave cylinder and a conduit connecting the master cylinder to the slave cylinder. A leakproof quick-connect connector is placed between the master cylinder and the slave cylinder, preferably at the end of the conduit where it connects to the master cylinder or the slave cylinder, one member of the connector forming part of the master cylinder or slave cylinder. The apparatus, after assembly, is filled with hydraulic fluid, the two members of the connector being held momentarily engaged. After filling, the connector is broken, and the filled components are shipped to a user. After installation of the apparatus for operation of a mechanism such as a clutch release mechanism, the two connector members are reconnected, and the connector members having been provided with a one-way locking member can no longer be separated such as to preserve the integrity of the system.

5 Claims, 5 Drawing Figures

U.S. Patent Nov. 25, 1986 Sheet 1 of 2 4,624,290
FIG. 1
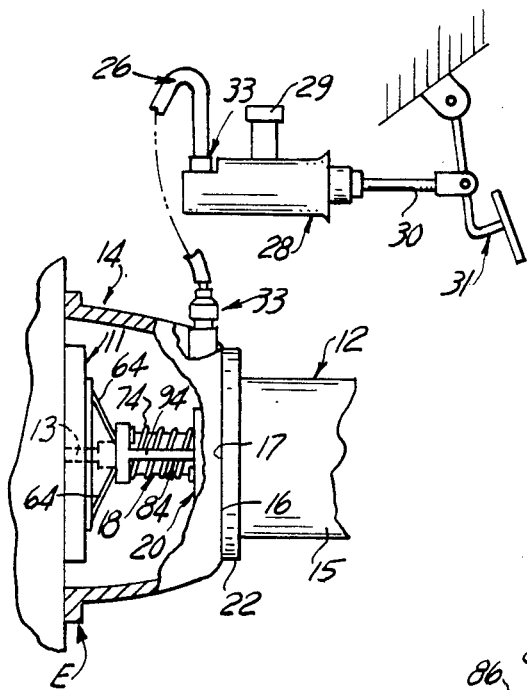
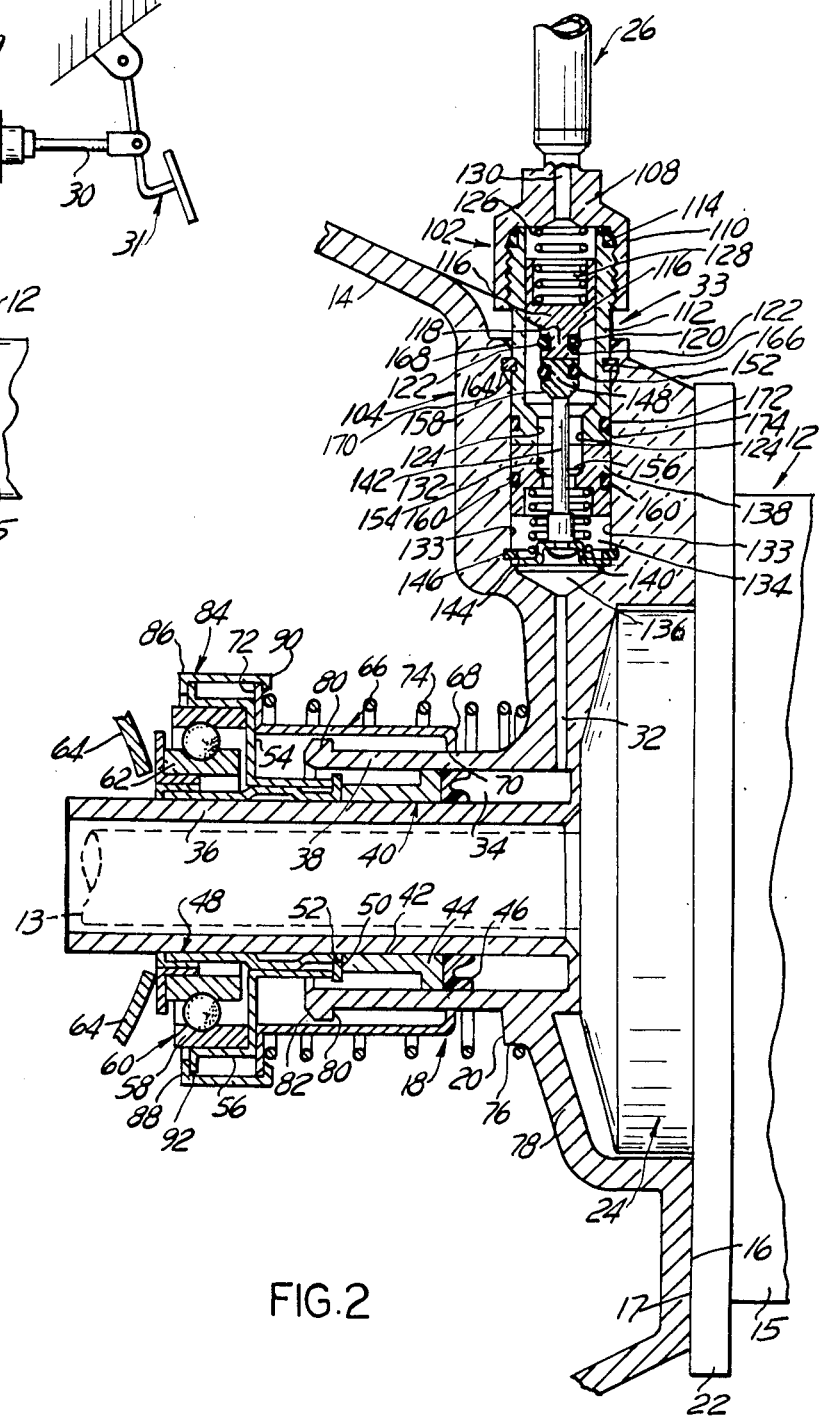
FIG. 2

U.S. Patent  Nov. 25, 1986  Sheet 2 of 2  4,624,290
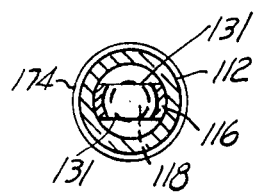
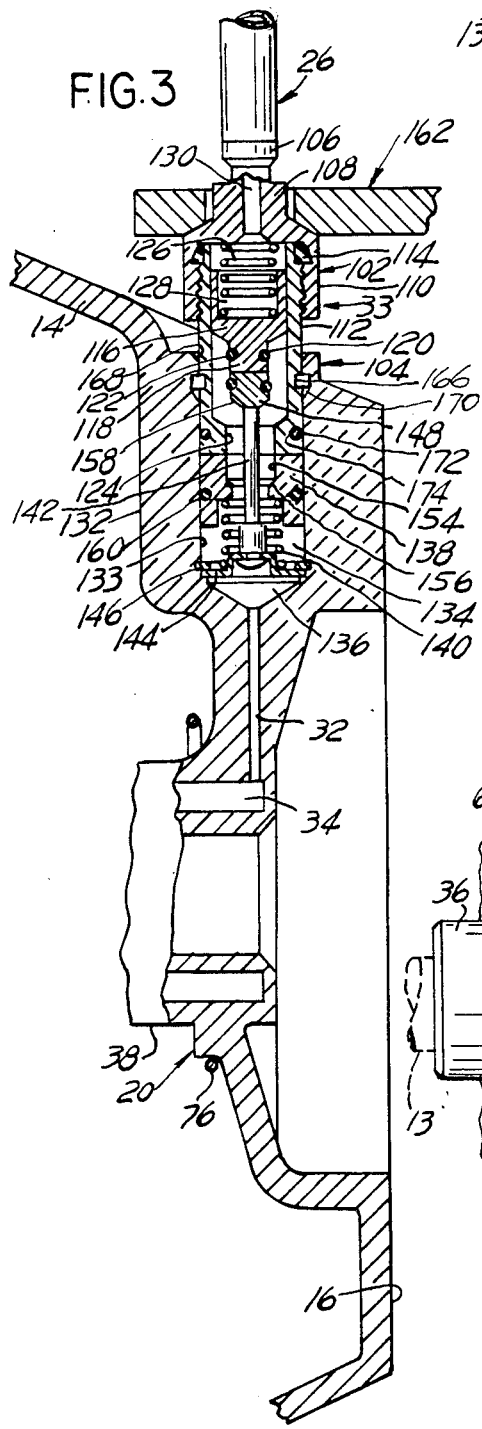
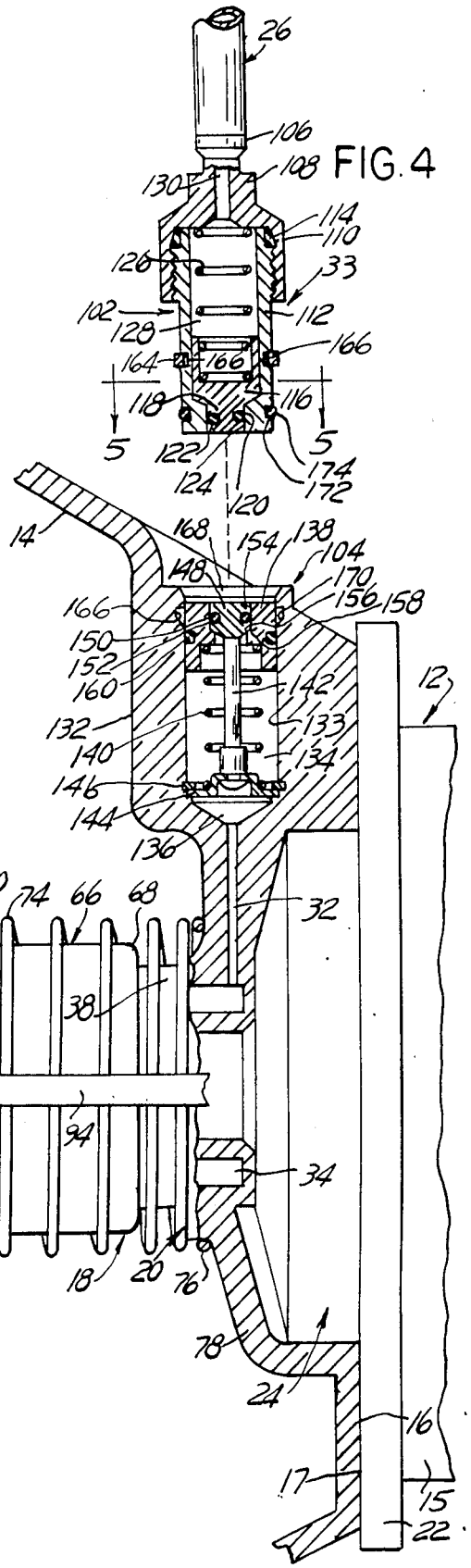

PREFILLED HYDRAULIC CONTROL APPARATUS FOR MOTOR VEHICLE

BACKGROUND OF THE INVENTION

The present invention relates to motor vehicle clutch control mechanisms in general, and more particularly to a friction clutch hydraulic control apparatus comprising a slave cylinder for operating the clutch release mechanism remotely from a master cylinder, the hydraulic control mechanism being prefilled with hydraulic fluid and pretested prior to shipment to a motor vehicle manufacturer for installation in a motor vehicle.

It is now known to prefill with hydraulic fluid a motor vehicle clutch control apparatus, comprising a master cylinder, a reservoir of fluid, and a slave cylinder for operating the throwout bearing of a mechanical diaphragm spring clutch, as disclosed in Britist Pat. No. 1,539,879 and in corresponding U.S. Pat. No. 4,407,125 and co-pending application Ser. No. 376,248, filed May 10, 1982, all assigned to the same assignee as the present application. In addition, co-pending applications Ser. Nos. 477,159, 477,160, 477,161 and 477,162, all filed Mar. 21, 1983 and assigned to the same assignee as the present application, also disclose diverse forms of prefilled hydraulic control mechanisms for motor vehicle clutches.

Prefilling with hydraulic fluid and pretesting hydraulic apparatus for operating motor vehicle mechanical clutches present the many advantages, for the motor vehicle manufacturer, of receiving a fully assembled mechanism comprising all the components filled with hydraulic fluid and pretested for proper operation, ready to install on a motor vehicle on the assembly line, without requiring that the components be installed separately, connected by way of a flexible conduit, and filled after installation with hydraulic fluid while being purged of any air contained in the apparatus.

In apparatus wherein the slave cylinder, actuating the clutch release mechanism, takes the form of a conventional cylindrical cylinder-piston assembly with the piston rod projecting from the cylinder housing attached at its end to the clutch release lever, the slave cylinder being attached at some portion of the clutch bell housing, permanent connection of the master cylinder to the slave cylinder by means of a flexible conduit, and prefill of the apparatus with hydraulic fluid do not present much inconveniences, whether the slave cylinder or the master cylinder is installed first on the vehicle, and the other cylinder installed at some other subsequent station on the assembly line. The last installed component may be simply left dangling on the end of the flexible conduit, or may be attached by means of straps, wires or strings to some portion of the motor vehicle frame or body, until definitely mounted in its operative position. However, with the present trend towards utilizing annular slave cylinders, disposed concentric to the driveshaft and bolted either to the face of the transmission or gearbox casing or, in the alternative, mounted on a side of or made integral with the clutch bell housing, such that the annular piston within the concentric annular slave cylinder may operate the clutch throwout bearing, it is difficult to provide a fully assembled, fully tested, prefilled apparatus, without some accompanying inconveniences. Such inconveniences relate to the requirement that the annular slave cylinder be installed first in the clutch bell housing, or on the transmission casing face, and the master cylinder on the end of the flexible line or conduit interconnecting the master and slave cylinders be provisionally attached, in some manner by strings, wires or straps to the motor vehicle frame, and subsequently installed in its proper position through the passenger compartment floorboard or bulkhead.

SUMMARY OF THE INVENTION

The present invention remedies the inconveniences enumerated hereinbefore with respect to preassembled prefilled hydraulic control apparatus for motor vehicle mechanical clutches, more particularly in structures wherein the throwout bearing is operated by a concentric annular slave cylinder, while presenting all the advantages of prefilled pretested clutch control apparatus.

Such results are achieved by providing a pretested prefilled hydraulic clutch control mechanism provided with an irreversible one-way quick-connect fitting either at some point of the flexible conduit connecting the master cylinder to the slave cylinder or, preferably, at one end of the conduit for connection to the master cylinder or preferably for connection to the slave cylinder. The one-way quick-connect fitting is arranged such that after the hydraulic control mechanism has been assembled, prefilled with hydraulic fluid and pretested, the connection between the master cylinder and the slave cylinder may be broken, without loss of fluid, or negligible loss of fluid, and the apparatus may be shipped to the motor vehicle manufacturer, completely filled with hydraulic fluid but in two separate portions such that the concentric slave cylinder may be made a part of the clutch bell housing, or of the transmission casing, and thus installed in the motor vehicle at whatever station on the assembly line that the clutch or transmission is installed, and such that the master cylinder may be installed in the motor vehicle also at whatever appropriate station, and the two connected together without any loss, or negligible loss, of fluid and without introduction of air into the apparatus.

Those and other objects of the present invention will become apparent to those skilled in the art when the following description of an example of the best mode contemplated at the present for practicing the invention is read in conjunction with the accompanying drawing wherein like reference numerals refer to like or equivalent parts, and in which:

BRIEF DESCRIPTION OF THE DRAWING

FIG. 1 is a schematic representation of a clutch hydraulic control apparatus according to the present invention;

FIG. 2 is a partial longitudinal section thereof, at an enlarged scale;

FIGS. 3–4 are views similar to FIG. 2, omitting the elements of FIG. 2 not necessary for a proper understanding of the invention and illustrating the operation of the invention; and FIG. 5 is a partial section on line 5—5 of FIG. 4.

DETAILED DESCRIPTION OF THE PREFERRED EMBODIMENT

Referring to the drawing, and more particularly to FIG. 1, a motor vehicle transmission is schematically illustrated as comprising a friction clutch assembly 11 and a gearbox or transmission 12 enclosed in a casing or housing 15. A driveshaft 13 drives the gearbox 12 from the clutch assembly 11. A bell housing 14, surrounding the clutch assembly 11, is bolted on the rear face of the motor vehicle engine E. The rear face 16 of the bell housing 14 is bolted to the face 17 of the gearbox casing 15. An annular hydraulic slave cylinder 18 is disposed around the driveshaft 13 within the bell housing 14. In the example of structure illustrated, as best shown at FIG. 2, the slave cylinder 18 has a one-piece housing 20 cast integral with the clutch bell housing 14. The face 17 of the gearbox casing 20 is on a flange 22, and an end plate 24 closing the end of the gearbox casing 15 is also bolted to the face 17 of the gearbox casing 15, the transmission input shaft 13, as shown in dashed lines, projecting through the end plate 24.

The slave cylinder 18 is connected via a hydraulic fluid conduit 26 to a master cylinder 28, FIG. 1. The master cylinder 28 is provided with a built-in hydraulic fluid reservoir 29, in the example of structure illustrated, and has an input rod 30 pivotally connected at an end to a clutch control pedal 31 installed within the driver compartment of a motor vehicle, not shown. The rod 30, as is well known, is connected to a piston, not shown, disposed in the master cylinder 28 for displacing the hydraulic fluid through the line 26 to the slave cylinder 18 when the clutch pedal 31 is depressed. The line 26 is a flexible conduit or hose having a connector 33 for connection to the inlet of the slave connector 18, and has another connector 33 on the other end for connection to the outlet of the master cylinder 28.

The slave cylinder 18 is preferably of the type having a housing 20 which is formed integral with the clutch bell housing 14, as illustrated, or, in the alternative, which is formed integral with the transmission or gearbox casing end plate 24, as disclosed in details in application Ser. No. 537,869, filed Sept. 30, 1983 and assigned to the same assignee as the present application. In such structures, the slave cylinder 18 is already integral or preassembled to the clutch bell housing 14 when the bell housing is bolted to the transmission or gearbox casing 22 during assembly of a motor vehicle, or, in its alternate configuration, not shown here, the slave cylinder is already preassembled to the transmission or gearbox casing 15 by being made part of the casing end plate 24. An example of structure of a slave cylinder 18 having a housing 20 cast integral as a single piece with the clutch bell housing 14 is illustrated at FIG. 2, as an example of structure to which the present invention has particular applications, although it will be appreciated by those skilled in the art that the invention may be used in combination with any type of concentric slave cylinder as disclosed in detail in the aforesaid co-pending application, or to any hydraulic control apparatus for a motor vehicle mechanical clutch, whether utilizing a concentric slave cylinder or more conventional cylindrical slave cylinder.

In the example of structure illustrated at FIG. 2, the slave cylinder 18 has a housing 20 cast integral as a single piece with the clutch bell housing 14, and provided with a passageway 32 leading into an annular chamber 34 formed between two concentric tubular portions 36 and 38 cast integral together with the clutch bell housing 14. An annular piston 40 is reciprocably and slidably disposed in the annular chamber 34 of the cylinder housing 20 between the two concentric tubular portions 36 and 38, the piston 40 having a relatively thin cylindrical portion slidably fitting about the periphery of the inner tubular portion 36, as shown at 42, and an integrally formed larger diameter annular head portion 44 slidably fitting between the concentric tubular portion 36 and 38. An elastomeric annular seal 46, V-shaped in section, is freely disposed in the annular chamber 34 above the annular head 44 of the piston 40, such as to prevent leakage of fluid from the annular chamber 34 past the piston 40.

A metallic sleeve, or carrier, 48 is slidably disposed around the periphery of the inner tubular portion 36 of the cylindrical housing 20. The carrier 48 has a flanged end portion 50 freely engaged with the end face 52 of the cylindrical portion 42 of the piston 40, and another flange portion 54 disposed at its other end having a bent-over rim 56 fixedly supporting the outer race 58 of a ball bearing 60 forming the clutch throw-out bearing, the bearing outer race 58 being for example press-fitted within the carrier rim 56. The inner race 62 of the throw-out bearing 60 is arranged to engage the end of the clutch release fingers 64 such that when the throw-out bearing 60 is displaced outwardly from the position indicated in full line at FIG. 2, the clutch 11, FIG. 1, is released.

A dust cover 66 is disposed surrounding a portion of the carrier 48 and a portion of the peripheral surface of the outer tubular portion 38 of the cylinder housing 20. The dust cover 66 is generally cylindrical in shape and is molded of plastic such as nylon. One end of the dust cover 66 is formed with an inwardly radially projecting flange or lip 68 having an inner edge 70 in sliding engagement with the peripheral surface of the cylinder outer tubular portion 38. The other end of the dust cover 66 has an outwardly projecting flange portion 72 abutting against the flange portion 54 of the carrier 48. A coil spring 74 is held in compression between the flange portion 54 of the carrier 48 and an annular abutment 76 formed on a radially outwardly extending flange portion 78 of the cylinder housing 20, and thus tends to urge the flange 72 of the dust cover 66 engaged with the flange portion 54 of the carrier 48 with the result that when the throw-out bearing 60 is reciprocated, as a result of reciprocation of the piston 40, the dust cover 66 reciprocates in unison with the throw-out bearing, the inner edge 70 of the dust cover lip 68 remaining in engagement with the peripheral surface of the outer tubular portion 38 of the slave cylinder housing 20.

The slave cylinder housing 20 has at least a pair of diametrically arranged outwardly projecting lugs 80 disposed at the end of the outer tubular portion 38 of the slave cylinder housing 20, each lug 80 having an inclined leading edge forming a ramp 82. During assembly of the slave cylinder 18, the lugs 80 are engaged below the dust cover 66 by snapping the edge 70 of the dust cover lip 68 over the outwardly projecting lugs 80, the lug ramp 82 facilitating the passage of the lip edge 70 over the lugs 80.

The dust cover 66, in addition to acting as a seal against introduction of dirt therebelow, acts as a retainer preventing travel of the carrier 48 and the throw-out bearing 60 after assembly of the slave cylinder 18 beyond the limits defined by the inner face of the dust cover lip 68 engaging the lugs 80, under the urging action of the compressed coil spring 74. The coil spring 74 is relatively weak and, functionally, operates only to urge the throw-out bearing 60 constantly in engagement with the end of the fingers 64 of the clutch release mechanism, after installation of the assembly consisting of the clutch bell housing 14 and the integral slave cylinder 18 in a motor vehicle transmission train.

A restraining strap, designated generally at 84, is provided for retracting the throw-out bearing 60 to the position shown at FIGS. 1 and 2, after assembly of the slave cylinder 18, against the action of the compressed coil spring 74. The restraining strap 84 holds the throw-out bearing 60 in a retracted position during filling of the hydraulic apparatus with hydraulic fluid, during shipment to a motor vehicle manufacturer and during assembly of the hydraulic clutch release system of the invention on a motor vehicle on the assembly line. Prefilling of the apparatus may be effected by filling the reservoir 29, FIG. 1, the master cylinder 28, the line 26 and the slave cylinder 18 with hydraulic fluid at a pressure slightly over atmospheric pressure, after opening a bleed nipple, not shown, until all atmospheric air is evacuated from the apparatus, in the same manner as disclosed in detail in U.S. Pat. No. 4,407,125, and, in co-pending application Ser. No. 376,248, filed May 10, 1982 and assigned to the same assignee as the present application. Alternatively, atmospheric air may be evacuated from the whole apparatus and the apparatus subsequently filled with fluid, as is explained in detail in U.S. Pat. No. 4,503,678. In addition to providing a subassembly of a clutch release hydraulic unit, including a slave cylinder built in the clutch bell housing which is ready to be assembled on a motor vehicle on the assembly line, prefilling of the hydraulic apparatus permits to test the apparatus after assembly for leakage and proper operation, before shipment to a motor vehicle manufacturer.

The restraining strap 84 is preferably molded of plastic, such as nylon, and comprises an annular coller 86 provided with a pair of substantially parallel inwardly directed end flanges 88 and 90, FIG. 2, fitting over respectively a flange 92 formed on the end of the rim portion 56 of the carrier 48 and the end of the flange 72 of the dust cover 66. Alternatively, the restraining strap 84 and the dust cover 66 may be molded in a single piece, not shown. A pair of bands or strips 94, FIG. 1, are integrally molded with and extend from the strap annular coller 86, the free end of each band or strip 94 terminating, for example, with an integral strut, not shown, or other means for attaching the end of each band or strip to the slave cylinder housing 20, at the housing flange 78. Each band or strip 94 of the restraining strap 84 is provided with a weakened portion, which may be a portion of reduced thickness, or a portion of reduced width, or both. After installation of the apparatus of the invention in a motor vehicle, and upon first actuation of the slave cylinder 18, hydraulic fluid displaced from the master cylinder 28 to the annular chamber 34 in the slave cylinder casing 20 causes displacement of the seal 46 and piston 40, and displacement of the throw-out bearing 60 as a result of the coupling between the piston 40 and the throw-out bearing 60 through the carrier 48, with the result that the bands or strips 94 are broken at their weakened portion, thus releasing the throw-out bearing 60 for normal operation by the slave cylinder 18.

The structure of the slave cylinder 18, hereintofore described, is the same as one of the examples of structure disclosed in copending application Ser. No. 537,869, filed Aug. 30, 1983, assigned to the same assignee as the present application, and is herein given only as an example of practical application for which the present invention is particularly useful. The crux of the present invention is the provision of a leakproof quick-connect connector 33 at one end of the flexible conduit 26 interconnecting the master cylinder 28, FIG. 1, to the slave cylinder 18. One of the connectors 33, for example the one on the end of the flexible conduit 26 attached to the master cylinder 28 may consist of a conventional connector, while the other connector 33 at the other end of the flexible conduit 26 attached to the slave cylinder 18, preferably for practical reasons and for best illustrative purpose, is of the leakproof quick disconnect type. It will, however, be readily apparent to those skilled in the art that the end connector 33 connecting the flexible conduit 26 to the master cylinder 28 may be a leakproof quick-connect connector or that both end connectors 33 may be conventional and a leakproof quick-connect connector be placed somewhere along the flexible conduit 26 to permit separating the master cylinder 28 from the slave cylinder 18, after prefilling of the clutch control apparatus with hydraulic fluid, testing the integrity of the apparatus and prior to shipment to a motor vehicle manufacturer for assembly in a motor vehicle on the assembly line.

In the example of structure illustrated, the connector 33 connecting the flexible conduit 26 to the inlet passageway 32 of the slave cylinder 18 has been arbitrarily chosen to be of the leakproof quick-connect type. The leakproof quick-connect connector 33 is formed of two complementary half connectors or members 102 and 104. The half connector 102, or male member in the example of structure illustrated, is mounted on the end of the flexible conduit 26 by having an appropriate tubular fitting 106 having a reduced diameter portion, not shown, projecting within the flexible conduit 26, an appropriate clamp, now shown, ensuring a leakproof mechanical connection between the end of the flexible conduit 26 and the fitting 106, or any other appropriate conventional well known manner of coupling of the flexible conduit 26 to the fitting 106 may be used. The tubular fitting 106 is formed integral with an end cap 108 having a rim 110 into which is threadably fastened, crimped or welded, a tubular body member 112, an appropriate gasket 114 ensuring leakproof connection between the two elements in threaded or crimped structures. A valve spool 116, having a cylindrical reduced end portion 118 provided with a groove 120 in which is disposed an O-ring 122, is slidably disposed in the tubular body member 112. The tubular body member 112 has a restricted diameter portion or orifice 124 at its open end such that the spool valve 116, urged by a coil spring 126 disposed therebehind tends to be displaced to the position shown at FIG. 4, the interior space or chamber 128 within the tubular body member 112 being closed at its open end by the O-ring-provided reduced diameter portion 118 of the valve spool 116 engaged in the orifice 124. The chamber 128 within the tubular body member 112 is, at its other end, continuously placed in communication, through a passageway 130 disposed in the end cap 108, with the interior of the flexible conduit 26. Two opposite sides of the valve spool 116 are cut out, as shown at 131, FIG. 5, such that the body of the valve spool 116 does not prevent flow of fluid into, and from, the chamber 128, the valve spool reduced end portion 118 only being effective to close the end of the chamber 128 when urged within the restricted diameter portion or orifice 124 of the tubular body member 112.

The connector second half 104, or female member in the example of structure illustrated, takes the form of a housing 132 which may conveniently be cast integral with the clutch bell housing 14 and the housing 20 of the slave cylinder 18, as shown, or in the alternative, may take the form of a cylindrical housing fastened to the unitary casting of the clutch bell housing 14 and slave cylinder housing 20. A bore 133 in the housing 132 defines a chamber 134 having an end 136 placed in communication with the passageway 32 leading into the slave cylinder annular chamber 34. An annular sleeve 138 is slidably disposed within the bore 133 and is normally urged toward the open end of the bore 133 by a coil spring 140. A rod 142 attached to the bottom of the bore 133 by means of an appropriate generally U-shaped bracket 144, held in position by an expandable split spring ring 146 disposed in an appropriate groove in the surface of the bore 133, is provided on its other end with an enlarged head portion 148 having a peripheral groove 150 in which is disposed an O-ring 152. The O-ring provided enlarged head portion 148 of the rod 142 fits within the bore or orifice 154 of the annular sleeve 138, and the bore 154 of the annular sleeve 138 has a reduced diameter portion forming an annular abutment 156 for engagement with a corresponding annular surface 158 on the interior end face of the rod enlarged head portion 148, such as to effectively limit the outward displacement of the annular sleeve 138. The peripheral surface of the annular sleeve 138 is provided with a groove in which is disposed a compressed O-ring 160. It is evident that in the position of the annular sleeve 138 shown at FIG. 4 the inner chamber 134 of the tubular housing 132 is effectively appropriately isolated from the ambient.

After assembly of the master cylinder 28 and slave cylinder 18, and attachment of the flexible conduit 26 to the master cylinder 28, FIG. 1, the hydraulic apparatus is filled with hydraulic fluid, preferably according to the method described in detail in U.S. Pat. No. 4,503,678, for example by evacuating the atmospheric air from the interior of the apparatus and filling the apparatus with an appropriate hydraulic fluid. In order to accomplish the exhausting and filling operation, and effecting appropriate tests on the apparatus, the two half connectors 102 and 104 are momentarily coupled as illustrated at FIG. 3 by introducing the tubular body 112 of the half connector 102 into the tubular housing 132 of the half connector 104, and holding one within the other by means of an appropriate clamping means 162 in a holding fixture, not shown. As a result of the end face of the valve spool end portion 118 engaging with the end face of the rod enlarged head portion 148, thus causing the spool valve 116 to retract within the tubular member 112 against the action of the spring 126, combined with a simultaneous retraction of the annular sleeve 138, while compressing the spring 140, as a result of the end face of the annular sleeve 138 being pushed by engagement with the end face of the tubular member 112, the internal chambers 128 and 134 of the two half connectors 102 and 104 are open to one another, thus permitting direct fluid communication between the annular chamber 34 of the slave cylinder 18 and the interior of the master cylinder 28 through the flexible conduit 26. After filling of the apparatus with hydraulic fluid, and after running appropriate tests, the connection between the master cylinder 28 and the slave cylinder 18 is broken by releasing the clamp 162, thus causing the valve spool 116 of the half connector 102 to close the orifice 124 under the action of the return spring 126, and the annular sleeve 138 of the half connector 104 to be displaced by the coil spring 140 to an appropriate position closing the orifice 154 in the annular sleeve 138, as illustrated at FIG. 4.

The slave cylinder 18, either forming an integral part of the clutch bell housing 14, as in the example of structure herein illustrated or adapted for installation within the clutch bell housing, or, in the alternative, forming part of the transmission casing or adapted to be mounted on the transmission casing end plate, is thus shipped, provided with its restraining strap 84 and prefilled with hydraulic fluid, to the user, namely a motor vehicle manufacturer. The prefilled slave cylinder 18 is shipped with a separate corresponding master cylinder 28 and an attached fluid reservoir 29, either made integral with the master cylinder or connected thereto by a flexible conduit, and the flexible conduit 26 connected to the master cylinder, all being also prefilled with hydraulic fluid. Prior to shipment, an elastically outwardly expandable spring steel ring 164 is placed in a corresponding groove 166 in the periphery of the tubular member 112 of the half connector 102.

During assembly of the motor vehicle on the motor vehicle manufacturer assembly line, the master cylinder 28, FIG. 1, is installed in its appropriate operative position and location on the vehicle, and the slave cylinder 18, which, in the example of structure illustrated, is part of the clutch bell housing 14, is installed separately on the motor vehicle frame. At some station on the assembly line, the master cylinder 28 and the slave cylinder 18 are interconnected by pushing the half connector 102 at the end of the flexible conduit 26 into the half connector 104 integral with the slave cylinder 18. The half connector tubular housing 132 is provided at its open end with an internal tapering and converging surface, or frusto conical surface 168 which, during introduction of the tubular body member 112 within the bore 133, causes the elastically compressible split spring ring 164 to progressively collapse within the groove 166 to conform to the internal diameter of the bore 133, while the end face of the tubular member 112 progressively displaces the annular sleeve 138 in the bore 133 to the position indicated at FIG. 2. The bore 133 is provided with a groove 170, FIG. 4, allowing the elastically compressible and expandable ring 164 to extend when reaching the level of the groove 170 such as to lock the tubular member 112 of the half connector 102 in the bore 133 of the half connector 104. For that purpose, the depth of the groove 170 is such that when the ring 164 expands within the groove 170, a sufficient portion of the ring extends into the retaining groove 166 on the periphery of the tubular member 112. The locking arrangement provided by the combinations of the grooves 166 and 170 and of the ring 164 is irreversible or, in other words, once the two half connectors 102 and 104 are interlocked, it is no longer possible to separate them without exerting considerable force, such as to preclude accidental or willful disconnect.

To prevent leakage past the connector, the tubular member 112 of the half connector 102 has a peripheral groove 172 proximate its end in which is disposed an O-ring 174. The locking groove 170 in the half connector tubular housing 132 has its lower sidewall provided with a radius or taper, such as to prevent tearing or damaging the O-ring 174 when the tubular member 112 is pressed into the bore 133 during re-assembly of the connector on the motor vehicle assembly line. It is readily apparent that if, as a result of the momentary connection of the two half connectors 102 and 104 during prefilling and testing of the apparatus, FIG. 3, the O-ring 174 is damaged during separation of the two half connectors, the O-ring 174 may be replaced at very low cost prior to shipment of the apparatus to a motor vehicle manufacturer.

It will be readily appreciated by those skilled in the art that the present invention thus permits to enjoy all the advantages provided by prefilled pretested hydraulic control apparatus for motor vehicle mechanical clutches, eliminating the requirement of filling the apparatus after installing the components on a motor vehicle on the assembly line and of testing the apparatus in situ, while permitting great flexibility in installations without the inconveniences of having a portion of the apparatus being provisionally attached to the motor vehicle frame or body by straps, strings or wires, or left dangling on the end of a flexible hose or conduit, which may cause accidental damages to one of the components.

Having thus described the present invention by way of an example of structure well designed to accomplish the objects of the invention, modifications thereof will be apparent to those skilled in the art, what is claimed as new is as follows.

We claim:

1. A method of prefilling a hydraulic control apparatus prior to shipment of said hydraulic control apparatus to a user, said hydraulic control apparatus comprising a hydraulic master cylinder, a remote hydraulic slave cylinder, and a conduit connecting said master cylinder to said slave cylinder, said method comprising disposing a leakproof connector having two interengageable complementary members on said conduit between said master cylinder and said slave cylinder, momentarily interconnecting said connector complementary members, filling said hydraulic control apparatus with hydraulic fluid, disconnecting said connector complementary members prior to shipment of said apparatus to the user, and providing said connector complementary members with one-way interlocking means preventing disconnect of said members after said connector members have been reengaged by the user.

2. The method of claim 1 wherein said hydraulic control apparatus is a motor vehicle clutch release mechanism.

3. The method of claim 2 further comprising the step of providing said hydraulic slave cylinder with a breakable restraining strap preventing actuation of said slave cylinder until reconnected to said master cylinder, said restraining strap being broken upon first actuation of said slave cylinder under the control of said master cylinder.

4. The method of claim 1 wherein said connector is disposed at the end of said conduit attached to said master cylinder.

5. The method of claim 1 wherein said connector is mounted at the end of said conduit attached to said slave cylinder.

* * * * *